(12) United States Patent
Bixel

(10) Patent No.: US 7,690,704 B2
(45) Date of Patent: Apr. 6, 2010

(54) METHOD AND APPARATUS FOR REMOVING/CARRYING COOKING PANS AND DEVICES

(76) Inventor: Joe Bixel, 138 Mclean St., Iselin, NJ (US) 08830

( * ) Notice: Subject to any disclaimer, the term of this patent is extended or adjusted under 35 U.S.C. 154(b) by 118 days.

(21) Appl. No.: 11/941,320

(22) Filed: Nov. 16, 2007

(65) Prior Publication Data
US 2009/0126120 A1 May 21, 2009

(51) Int. Cl.
*B67B 7/00* (2006.01)
(52) U.S. Cl. .................... 294/25; 294/27.1; 81/3.55
(58) Field of Classification Search ............ 294/27.1, 294/32, 25; 254/28; 81/3.55, 3.57; 248/214, 248/215, 301, 340, 113, 229.16
See application file for complete search history.

(56) References Cited
U.S. PATENT DOCUMENTS

| | | | | |
|---|---|---|---|---|
| 414,053 A | * | 10/1889 | Jones | 248/113 |
| 1,015,503 A | * | 1/1912 | Merrill | 140/123 |
| 1,387,014 A | * | 8/1921 | Saul | 81/3.09 |
| 2,939,605 A | * | 6/1960 | Noble | 220/285 |
| 3,179,287 A | * | 4/1965 | Rickmeier, Jr. | 220/324 |
| 3,199,720 A | * | 8/1965 | Forman et al. | 206/162 |
| 3,495,284 A | * | 2/1970 | Weingardt | 7/152 |
| 3,610,076 A | * | 10/1971 | Martens | 81/3.55 |
| 4,765,208 A | * | 8/1988 | Sakosky | 81/3.55 |
| 5,823,483 A | * | 10/1998 | Gaskill | 248/37.6 |

* cited by examiner

*Primary Examiner*—Dean J Kramer
(74) *Attorney, Agent, or Firm*—Walker J. Tencza, Jr.

(57) ABSTRACT

An apparatus is provided which can be used to pry apart a first object, such as a hotel pan, from a second object, such as a chaffing dish, and to lift the first object off of or out of the second object. The apparatus may be comprised of first, second, third, fourth, fifth, and sixth portions, which may be plates, and which may be integrated together. The first, second, fourth, and sixth portions may be substantially straight, while the third and the fifth portions may be substantially semicircular. In one embodiment, first and second fingers are inserted through the third and fourth portions before using the apparatus to pry apart the first object from the second object.

9 Claims, 7 Drawing Sheets

US 7,690,704 B2

METHOD AND APPARATUS FOR REMOVING/CARRYING COOKING PANS AND DEVICES

FIELD OF THE INVENTION

This invention relates to improved methods and apparatus concerning the removal and carrying of hotel pans, cooking pans, and/or other devices.

BACKGROUND OF THE INVENTION

There are various techniques known in the prior art for removing or carrying hotel pans, cooking pans and/or other devices.

SUMMARY OF THE INVENTION

In one embodiment, the present invention provides an apparatus which can be used to pry apart a first object from a second object and to lift the first object off of or out of the second object. The apparatus may be comprised of first, second, third, fourth, fifth, and sixth portions.

The first portion may be substantially straight, the first portion may have a first end and a second end, wherein the first portion narrows at its first end. The second portion may be substantially straight and substantially at a right angle with respect to the first portion. The second portion may have a first end connected to the second end of the first portion and a second end. The third portion may be substantially semicircular. The third portion may have a first end which is connected to the second end of the second portion, and a second end. The fourth portion may be substantially straight, and the fourth portion may have a first end which is connected to the second end of the third portion, and a second end. The fifth portion may be substantially semicircular, the fifth portion may have a first end which is connected to the second end of the fourth portion, and a second end. The sixth portion may be substantially straight. The sixth portion may have a first end which is connected to the second end of the fifth portion, and a second end.

The apparatus may be substantially made of stainless steel or hard plastic. Each of the first, second, third, fourth, fifth, and sixth portions may be a plate. The first, second, third, fourth, fifth, and sixth portions may be integrated into one unit.

A method is also provided which may include using a first end of the first portion of the apparatus to pry apart a first object from a second object into which the first object is inserted. The method may also include using the apparatus to lift up the first object by having the first portion underneath a bottom of the first object and applying force to the first portion to lift up the first object. The method may also include inserting a first finger and a second finger through the apparatus before using the apparatus to pry apart the first object from the second object. The first finger may be inserted substantially through the third portion of the apparatus and the second finger may be inserted substantially through the fifth portion of the apparatus.

In one embodiment of the present invention, the first object is a first cooking pan or hotel pan, and the second object is a second cooking pan or chaffing dish. In another embodiment, the first object is a sterno or burner lid and the second object is a body of the sterno or burner.

DETAILED DESCRIPTION OF THE DRAWINGS

Figure 7:
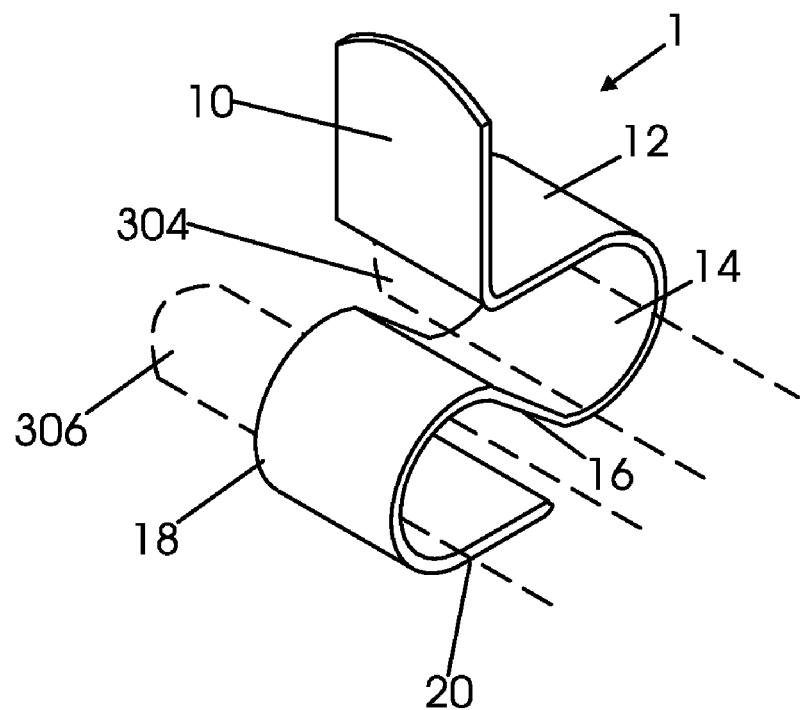
FIG. 7 shows a top, right side, front perspective view of the apparatus of FIG. 1.
Figure 8:
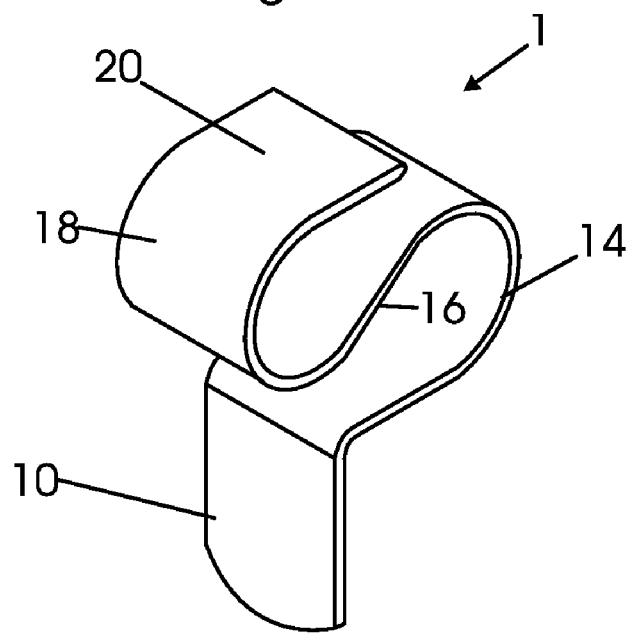
FIG. 8 shows a bottom, left side, front perspective view of the apparatus of FIG. 1.

FIGS. 1-6 show left side, right side, front, rear, top, and bottom views, respectively, of an apparatus 1 in accordance with an embodiment of the present invention. FIG. 7 shows a top, right side, front perspective view of the apparatus 1 of FIG. 1. FIG. 8 shows a bottom, left side, front perspective view of the apparatus 1 of FIG. 1.

The apparatus 1 includes portions 10, 12, 14, 16, 18, and 20. The portion 10 may terminate in a beveled, sharp, narrow, or shaved down edge 1a. The portions 10, 12, 14, 16, 18, and 20 may include surfaces 10a-b, 12a-b, 14a-b, 16a-b, 18a-b, and 20a-b, respectively. Portions 10, 12, 16, and 20 may be substantially straight, while portions 14 and 18 may be substantially semicircular. Portions 14 and 18 may each have a radius of one half inch.

The portions 10, 12, 14, 16, 18, and 20 may be integrated together into one apparatus 1. The apparatus 1 may be made of stainless steel, or hard plastic, or some other type of material which should not conduct or get hot quickly and which is a high strength material.

Figure 9:
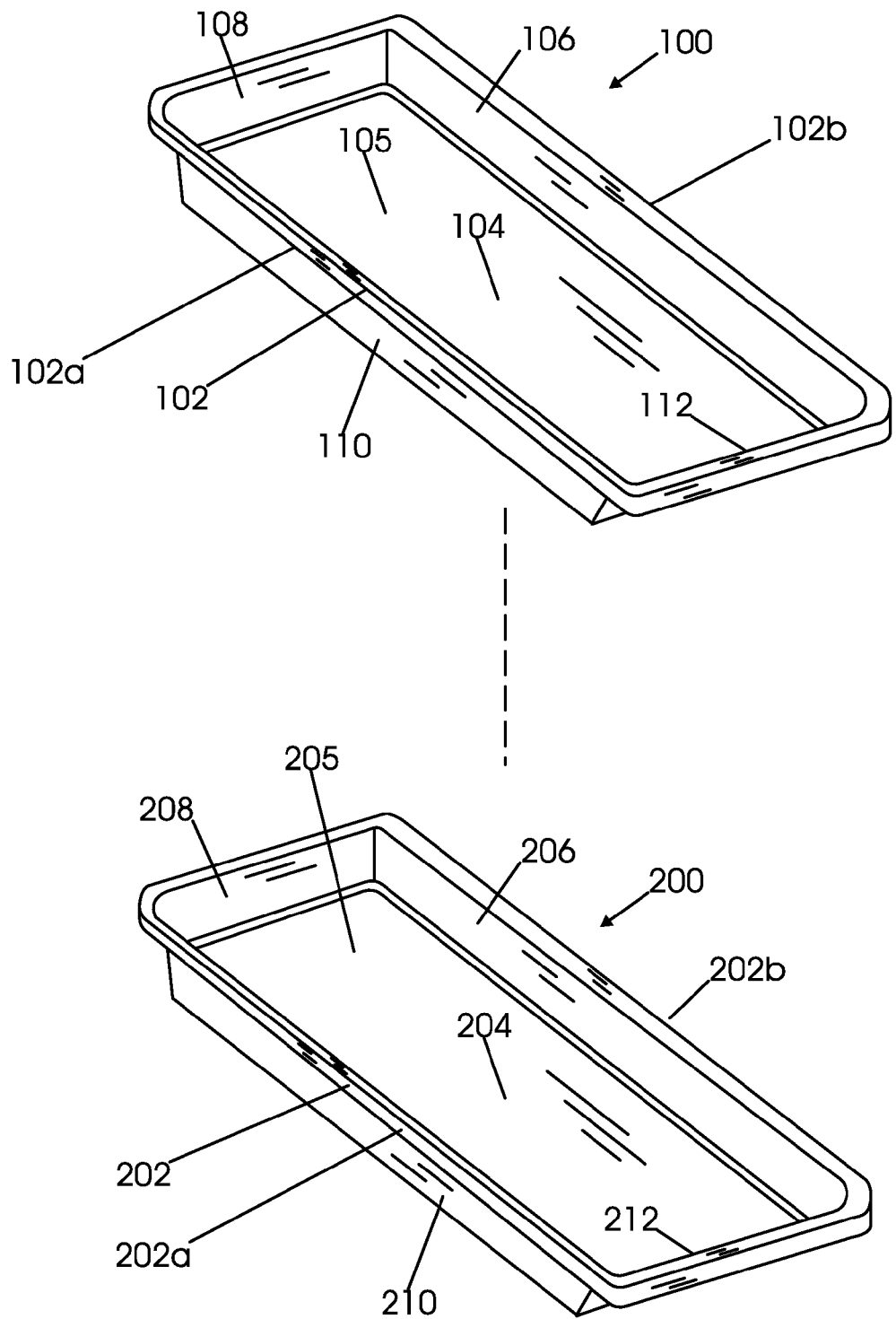
FIG. 9 shows a perspective view of first and second cooking pans known in the prior art.

FIG. 9 shows a perspective view of a first cooking pan or hotel pan 100 and a second cooking pan or chaffing dish 200 known in the prior art. The first cooking pan 100 may include bottom 104, sides or walls 106, 108, 110, and 112, and peripheral lip 102. The peripheral lip 102 may have a portion or side 102a and an opposing portion or side 102b. The first cooking pan 100 may include a chamber 105 which is bound by the bottom 104, and the sides or walls 106, 108, 110, and 112. The second cooking pan 200 may include bottom 204, sides or walls 206, 208, 210, and 212, and peripheral lip 202. The peripheral lip may have a portion or side 202a and an opposing portion or side 202b. The first cooking pan 100 may include a chamber 105 which is bound by the bottom 104, and the sides or walls 106, 108, 110, and 112. Water can be placed into the chamber 205 and heated so that food placed in the chamber 105 of the first cooking pan 100 can be kept warm, when the first cooking pan 100 is inserted into the second cooking pan 200.

Figure 10A:
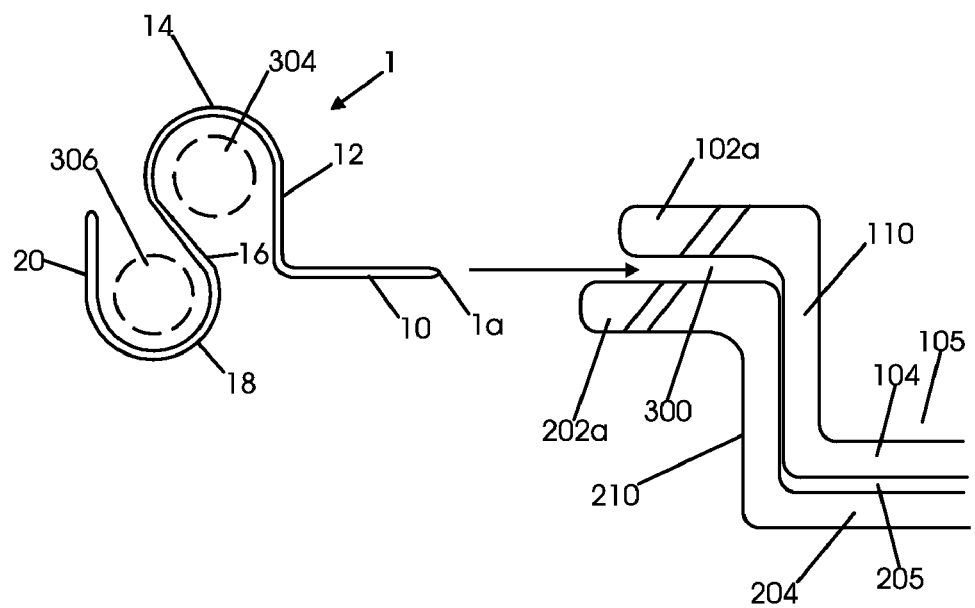
FIG. 10A shows a left side view of the apparatus of FIG. 1 and a cross sectional view of a portion of the first and second cooking pans of FIG. 9, with the first cooking pan inserted into the second cooking pan.

FIG. 10A shows a left side view of the apparatus 1 and a cross sectional view of a portion of the first cooking pan 100 and the second cooking pan 200, with the first cooking pan 100 inserted into the second cooking pan 200. FIG. 10A also shows dashed circles representing inserted fingers of a user. Dashed circles 304 and 306 represent inserted forefinger, and middle fingers, respectively, of a right hand of a user. The forefinger and middle fingers, shown by 304, and 306, are inserted into and through the apparatus 1, as shown in FIG. 10A in order to hold the apparatus 1 in the right hand of a user. The apparatus 1 can also be held in the left hand, or with a different set of fingers.

Figure 1:
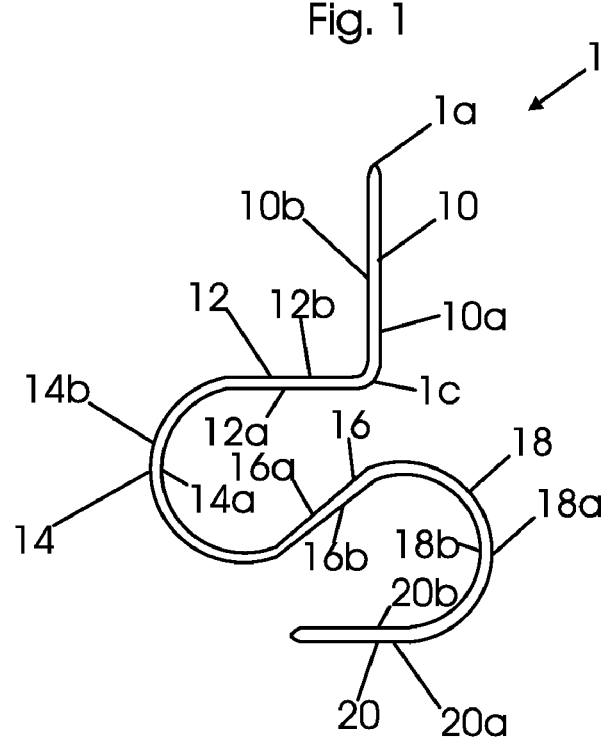
FIG. 1 shows a left side view of an apparatus in accordance with an embodiment of the present invention.
Figure 2:
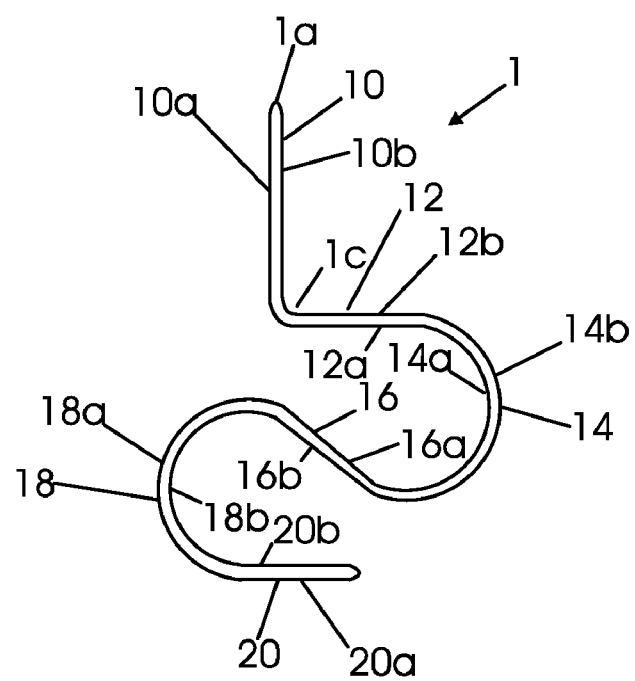
FIG. 2 shows a right side view of the apparatus of FIG. 1.
Figure 3:
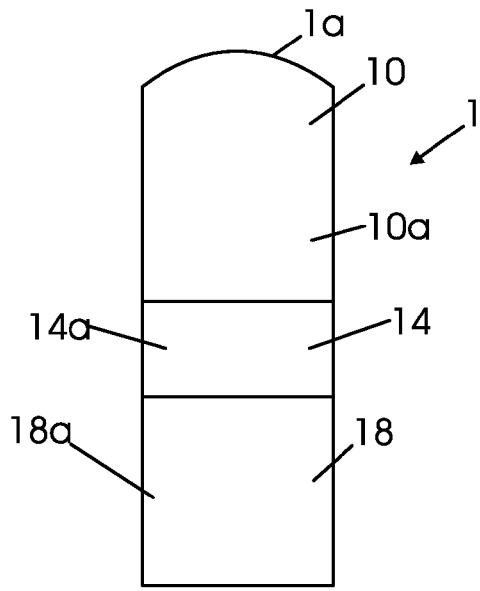
FIG. 3 shows a front view of the apparatus of FIG. 1.
Figure 4:
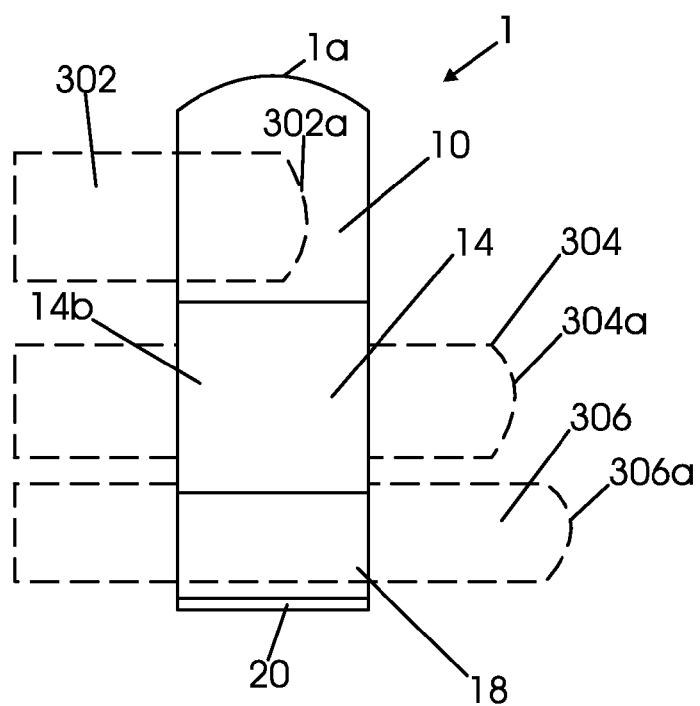
FIG. 4 shows a rear view of the apparatus of FIG. 1.
Figure 5:
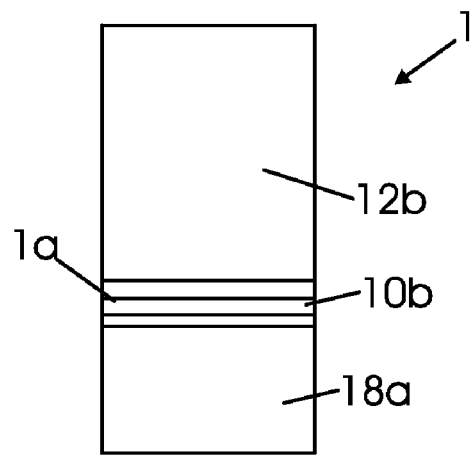
FIG. 5 shows a top view of the apparatus of FIG. 1.
Figure 6:
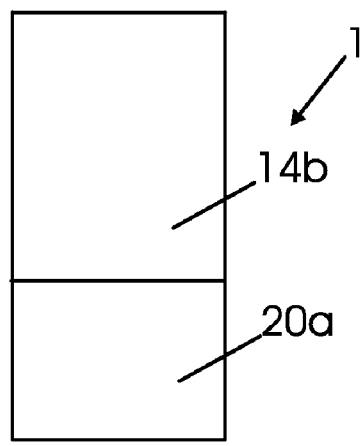
FIG. 6 shows a bottom view of the apparatus of FIG. 1.

A possible positioning of fingers 304 and 306 and a thumb 302 are shown by dashed lines in FIG. 4. A possible positioning of fingers 304 and 306 is also shown in FIG. 7 by dashed lines. The positioning of fingers 304 and 306 in FIGS. 4, 6, 10A-B, and 11A-B are meant to be the same or substantially the same, although the drawings may not be precisely accurate or drawn to scale. In FIG. 4 a portion of the thumb 302 may lie on the portion 10 of the apparatus 1 while the apparatus 1 is being used to pry something open. In that situation, a tip 302a of the thumb 302 extends over the portion 10 and the thumb 302 may be in contact with the portion 10 for leverage. However, the thumb 302 may be taken off of the portion 10 when a pan, such as first cooking pan 100 is being lifted. Typically only the fingers 304 and 306 would be used to lift the first cooking pan 100 off of or out of the second cooking pan 200. The finger 304 may be inserted through the portion 14 so that the tip 304a lies outside of the apparatus 1. The finger 306 may be inserted through the portion 18 so that the tip 306a lies outside of the apparatus 1.

Figure 10B:
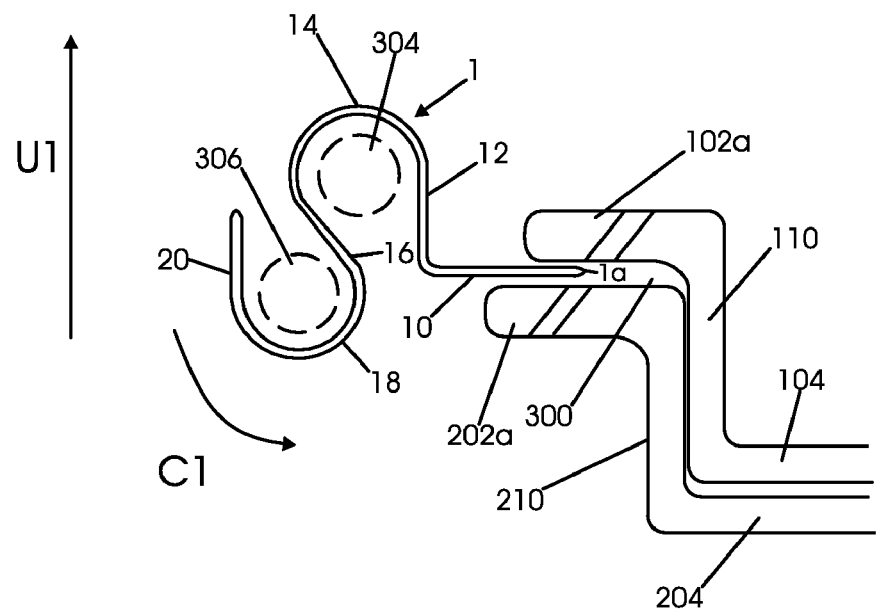
FIG. 10B shows a left side view of the apparatus of FIG. 1 and a cross sectional view of a portion of the first and second cooking pans of FIG. 9, with the first cooking pan (or hotel pan) inserted into the second cooking pan (or chaffing dish), and with a portion of the apparatus inserted into a gap between a lip of the first cooking pan and a lip of the second cooking pan.

With the apparatus 1 held by a user, as in FIG. 10A, the user would insert the edge 1a into a gap or junction 300 between lip side 102a of the first cooking pan 100 and lip side 202a of the second cooking pan 200, as shown in FIG. 10B. The user can then lift up the lip side 102a in the direction U1 shown in FIG. 10B and grab and hold the opposite lip side 102b with the user's left hand in order to remove the first cooking pan 100 from the second cooking pan 200. The user could also use another apparatus similar to apparatus 1, for the user's left hand, and insert this similar apparatus into a gap between the lip side 102 and the lip side 202b. In this scenario the user would be using two apparatuses, identical to or similar to apparatus 1, simultaneously, in order to remove the first cooking pan 100 from the second cooking pan 200.

The user could also rotate the apparatus 1 in a counterclockwise direction C1, as shown in FIG. 10B, in order to pry the lip side 102a from the lip side 202a. After rotating a sufficient amount, to allow insertion of a substantial portion of section or portion 10 (such as a majority of portion 10) of the apparatus 1 into the gap 300, the user could then lift the lip side 102a in the direction U1 and also lift the opposing lip side 102b with the user's left hand or with another apparatus similar to apparatus 1.

Figure 11A:
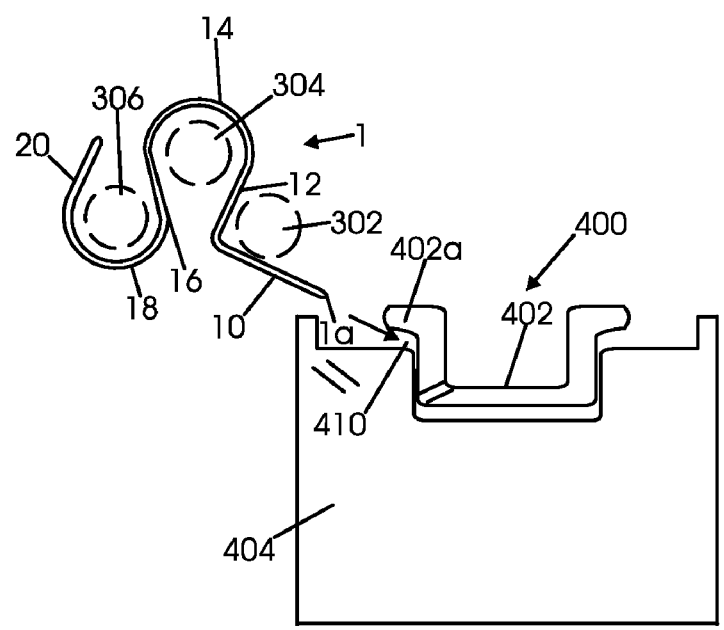
FIG. 11A shows a left side view of the apparatus of FIG. 1 and a cross section view of a sterno or burner.
Figure 11B:
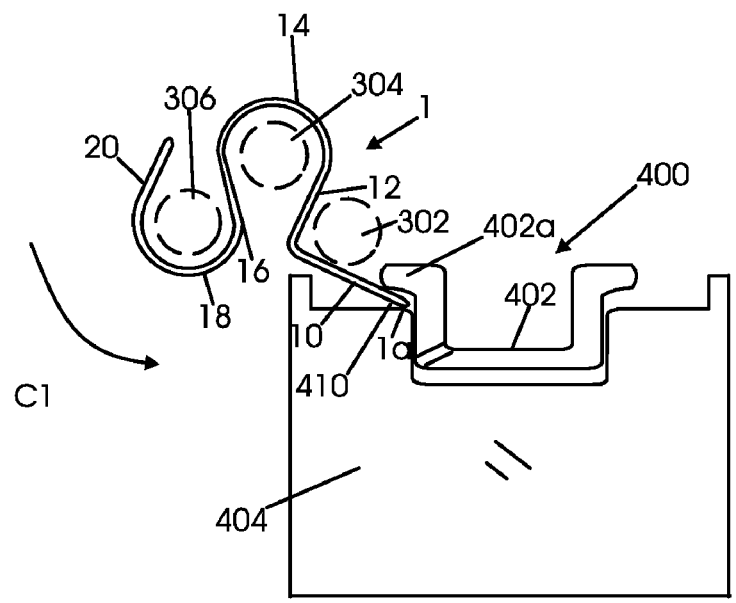
FIG. 11B shows a left side view of the apparatus of FIG. 1 and a cross section view of the sterno or burner with a portion of the apparatus inserted into a gap between a lid of the sterno and a body portion of the sterno.

The apparatus 1 can also be used to lift and/or pry a sterno or burner lid off of a burner. FIG. 11A shows a left side view of the apparatus 1 of FIG. 1 and a cross section view of a sterno or burner 400. Sternos or burners, such as 400 can be placed underneath the bottom 204 of the cooking pan 200 and lit, in order to keep water in cooking pan 200 hot and thereby keep food in cooking pan 100 hot. FIG. 11B shows a left side view of the apparatus 1 and a cross section view of the sterno or burner 400 with a portion or portion 10 of the apparatus 1 inserted into a gap 410 between a lid 402 of the sterno 400 and a body portion 404 of the sterno 400. FIGS. 11A and 11B also show dashed circles 302, 304, and 306 representing thumb, forefinger, and middle fingers of a user's right hand that have been inserted through the apparatus 1 at the locations indicated in FIGS. 11A and 11B. The apparatus 1 can be rotated in the counter clockwise direction C1, after the edge 1a and a portion of the portion 10, has been inserted into the gap or junction 410 between a lip edge 402a and the body portion 404.

The apparatus 1 is particularly helpful in a catering situation, where cooking pans, such as cooking pan 100, have to be removed from another cooking pan, such as 200, frequently, in order to replace hot items of food that have been consumed by guests, such as at a banquet or wedding reception.

The apparatus 1 can also be used for opening cans of beer or soda. The apparatus 1 can also be used to pry open a key ring to help get a key off of a key ring.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method comprising
using a first end of a first portion of an apparatus to pry apart a first object from a second object into which the first object is inserted; and
wherein the apparatus is comprised of:
the first portion which is substantially straight, the first portion having the first end and a second end, wherein the first portion narrows at its first end;
a second portion which is substantially straight and substantially at a right angle with respect to the first portion, the second portion having a first end connected to the second end of the first portion and a second end;
a third portion which is substantially semicircular, the third portion having a first end which is connected to the second end of the second portion, and a second end;
a fourth portion which is substantially straight, the fourth portion having a first end which is connected to the second end of the third portion, and a second end;
a fifth portion which is substantially semicircular, the fifth portion having a first end which is connected to the second end of the fourth portion, and a second end; and
a sixth portion which is substantially straight, the sixth portion having a first end which is connected to the second end of the fifth portion, and a second end; and
inserting a first finger through the apparatus before using the apparatus to pry apart the first object from the second object.

2. The method of claim 1 further comprising
using the apparatus to lift up the first object by having the first portion underneath a bottom of the first object and applying force to the first portion to lift up the first object.

3. The method of claim 1 wherein
the third portion has a diameter and the fifth portion has a diameter, and the diameter of the third portion and the diameter of the fifth portion are substantially the same; and
wherein the diameter of the third portion is approximately one inch.

4. The method of claim 1 wherein
the first finger is inserted substantially through the third portion of the apparatus before using the apparatus to pry apart the first object from the second object.

5. The method of claim 1 further comprising
inserting a second finger through the apparatus before using the apparatus to pry apart the first object from the second object.

6. The method of claim 4 further comprising
inserting a second finger through the apparatus before using the apparatus to pry apart the first object from the second object; and
wherein the second finger is inserted substantially through the fifth portion of the apparatus before using the apparatus to pry apart the first object from the second object.

7. The method of claim 1 wherein
the first object is a first cooking pan, and the second object is a second cooking pan.

8. The method of claim 1 wherein
the first object is a sterno lid and the second object is a body of the sterno.

9. The method of claim 1 wherein
the first portion has a length, and the length of the first portion is greater than the diameter of the third portion but less than twice the diameter of the third portion.

* * * * *